(12) United States Patent
Man

(10) Patent No.: US 8,558,669 B2
(45) Date of Patent: Oct. 15, 2013

(54) RADIO FREQUENCY IDENTIFICATION READER

(75) Inventor: Chun Sing Matthew Man, Hong Kong (HK)

(73) Assignee: Megabyte Ltd., Hong Kong (HK)

( * ) Notice: Subject to any disclaimer, the term of this patent is extended or adjusted under 35 U.S.C. 154(b) by 768 days.

(21) Appl. No.: 12/484,157

(22) Filed: Jun. 12, 2009

(65) Prior Publication Data

US 2010/0259364 A1    Oct. 14, 2010

Related U.S. Application Data

(60) Provisional application No. 61/168,600, filed on Apr. 12, 2009.

(51) Int. Cl.
| | |
|---|---|
| *H04Q 3/00* | (2006.01) |
| *G08B 13/14* | (2006.01) |
| *G08B 1/08* | (2006.01) |
| *G08B 1/00* | (2006.01) |
| *H03K 17/62* | (2006.01) |

(52) U.S. Cl.
USPC ............... 340/10.1; 340/10.51; 340/572.1; 340/572.2; 340/572.8; 340/539.13; 340/333; 340/14.61

(58) Field of Classification Search
USPC ............................................ 340/10.1–10.6
See application file for complete search history.

(56) References Cited

U.S. PATENT DOCUMENTS

| | | | |
|---|---|---|---|
| 6,118,189 A | 9/2000 | Flaxl | |
| 6,392,544 B1 * | 5/2002 | Collins et al. | ............ 340/572.7 |
| 7,205,896 B2 * | 4/2007 | Wu et al. | .................... 340/572.1 |
| 7,221,269 B2 * | 5/2007 | Onderko et al. | ......... 340/539.13 |
| 7,576,657 B2 * | 8/2009 | Duron et al. | ............... 340/572.7 |
| 7,973,645 B1 * | 7/2011 | Moretti et al. | ............... 340/10.1 |
| 2003/0174099 A1 * | 9/2003 | Bauer et al. | .................... 343/893 |

(Continued)

FOREIGN PATENT DOCUMENTS

EP     1793326     6/2007

OTHER PUBLICATIONS

GB Search Report of patent application No. GB0911795.3.

(Continued)

*Primary Examiner* — Daniel Wu
*Assistant Examiner* — Muhammad Adnan

(57) ABSTRACT

A RFID reader includes a radio frequency (RF) multiplexer having a plurality of antenna ports for connecting with a plurality of antennas respectively, a reader module having a first internal port and second internal port and being configured for communicating with a tag proximate to the RFID reader through one of the first and the second internal ports, a network module for connecting the RFID reader to a network, and a micro-controller module being connected to the RF multiplexer, the reader module and the network module. The micro-controller module is configured for controlling the reader module to communicate with the tag through a selected antenna port of the RF multiplexer or an external antenna device and for controlling the network module to communicate with the network. The first internal port of the reader module is connected to the RF multiplexer for the reader module to utilize the antennas connected to the antenna ports of the RF multiplexer. The second internal port of the reader module is configured for connecting to the external antenna device so that the reader module can utilize an external antenna connected to a selected antenna port of the external antenna device.

9 Claims, 13 Drawing Sheets

(56) References Cited

U.S. PATENT DOCUMENTS

| | | | |
|---|---|---|---|
| 2005/0219050 A1* | 10/2005 | Martin | 340/572.1 |
| 2007/0064902 A1* | 3/2007 | Glass et al. | 379/202.01 |
| 2008/0069736 A1* | 3/2008 | Mingerink et al. | 422/102 |
| 2009/0027202 A1* | 1/2009 | Copeland et al. | 340/572.1 |
| 2009/0267743 A1* | 10/2009 | Faroe et al. | 340/10.1 |

OTHER PUBLICATIONS

Search Report of Hong Kong Short-term patent application No. 09105314.9.

International Search Report of PCT patent application No. PCT/CN2010/071529.

* cited by examiner

RADIO FREQUENCY IDENTIFICATION READER

CROSS-REFERENCE TO RELATED APPLICATIONS

This application claims the benefit of U.S. Provisional Application No. 61/168,600, filed on Apr. 12, 2009; the contents of which is hereby incorporated by reference.

FIELD OF THE PATENT APPLICATION

The present invention generally relates to radio frequency identification (RFID) technologies and more particularly to a RFID reader with multiple expandable antenna ports.

BACKGROUND

RFID systems are being utilized in a multitude of applications. One of the common areas for RFID implementation is product (for inventory or for sales) identification. The bar code scanner technology is being gradually replaced by RFID technology. In a simple application, a passive RFID transponder, commonly called a tag or a card, is placed on an object that is to be identified. A RFID reader is then used to obtain information from the tag. The reader typically has a transceiver to transmit and receive signals, the transceiver being powered by a power source. The tag also has a transceiver to receive a signal from the reader and to transmit a response back to the reader. The tag is generally passive and powered by the electromagnetic field induced by the reader.

When the reader is powered on, it is configured to generate an electromagnetic field from its antenna. When the reader and the tag are within close proximity of each other, the electromagnetic field generated by the reader is coupled to the tag. The tag uses this coupled energy to power its circuitry. The reader transmits an interrogating signal to the tag, and in response the tag transmits a signal back to the reader. The tag may be placed on an item and the response from the tag may be processed to identify the item.

RFID systems may use active tags which carry their own source of power such as a battery, or passive tags which contain no source of power and relies entirely on power radiated by the reader unit. A passive tag reader is configured to continuously or periodically search for the presence of passive tags in a vicinity of the reader by transmitting power to any tag that is present and activated by that power. A passive tag does not announce its presence unless activated by the reader.

SUMMARY

The present patent application is directed to a radio frequency identification (RFID) reader. In one aspect, the RFID reader includes a radio frequency (RF) multiplexer having a plurality of antenna ports for connecting with a plurality of antennas respectively, a reader module having a first internal port and second internal port and being configured for communicating with a tag proximate to the RFID reader through one of the first and the second internal ports, a network module for connecting the RFID reader to a network, and a micro-controller module being connected to the RF multiplexer, the reader module and the network module. The micro-controller module is configured for controlling the reader module to communicate with the tag through a selected antenna port of the RF multiplexer or an external antenna device and for controlling the network module to communicate with the network. The first internal port of the reader module is connected to the RF multiplexer for the reader module to utilize the antennas connected to the antenna ports of the RF multiplexer. The second internal port of the reader module is configured for connecting to the external antenna device so that the reader module can utilize an external antenna connected to a selected antenna port of the external antenna device.

The RFID reader may further include a power over Ethernet (PoE) module. The PoE module is connected to the network module and configured for supplying power transferred from the network to the RFID reader.

The micro-controller module may be configured to provide a UART (universal asynchronous receiver/transmitter) to TCP/IP (Transmission Control Protocol/Internet Protocol) conversion for data communication and to control the first and the second internal ports in feeding data.

The RFID reader may further include a processor. The processor may be embedded in the micro-controller module and configured to monitor any changes in the detection of the RFID tag so as to determine whether the data associated with the tag has changed since a previous detection.

The RF multiplexer may include a plurality of RF switches, a plurality of co-planar waveguides for connecting the RF switches and each having an interior cavity, a first set of RF ports being configured to be the antenna ports for connecting to the antennas, a second RF port connected to the first internal port of the reader module, and an RF switch controller for selectively enabling a communication path between one of the first set of RF ports and the second RF port.

The RF multiplexer may include a dedicated RF port. The second internal port of the reader module is configured for connecting to the external antenna device through the dedicated RF port.

The second internal port of the reader module may be connected to an external antenna device. The external antenna device may include a radio frequency (RF) multiplexer having a plurality of antenna ports for connecting with a plurality of antennas respectively, a network module for connecting the external antenna device to a network, and a micro-controller module being connected to the RF multiplexer and the network module of the external antenna device. The micro-controller module may be configured for enabling the reader module to communicate with the tag through a selected antenna port of the RF multiplexer of the external antenna device and for controlling the network module to communicate with the network.

In another aspect, the present patent application provides a radio frequency identification (RFID) reader system. The RFID system includes a plurality of above-mentioned RFID readers, a network being connected with the RFID readers, and a backend processing unit being connected with the network. The RFID readers are configured for respectively sending identification data to the backend processing unit through the network and the backend processing unit is configured for processing the identification data.

DETAILED DESCRIPTION

Reference will now be made in detail to a preferred embodiment of the RFID reader disclosed in the present patent application, examples of which are also provided in the following description. Exemplary embodiments of the RFID reader disclosed in the present patent application are described in detail, although it will be apparent to those skilled in the relevant art that some features that are not particularly important to an understanding of the RFID reader may not be shown for the sake of clarity.

Furthermore, it should be understood that the RFID reader disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
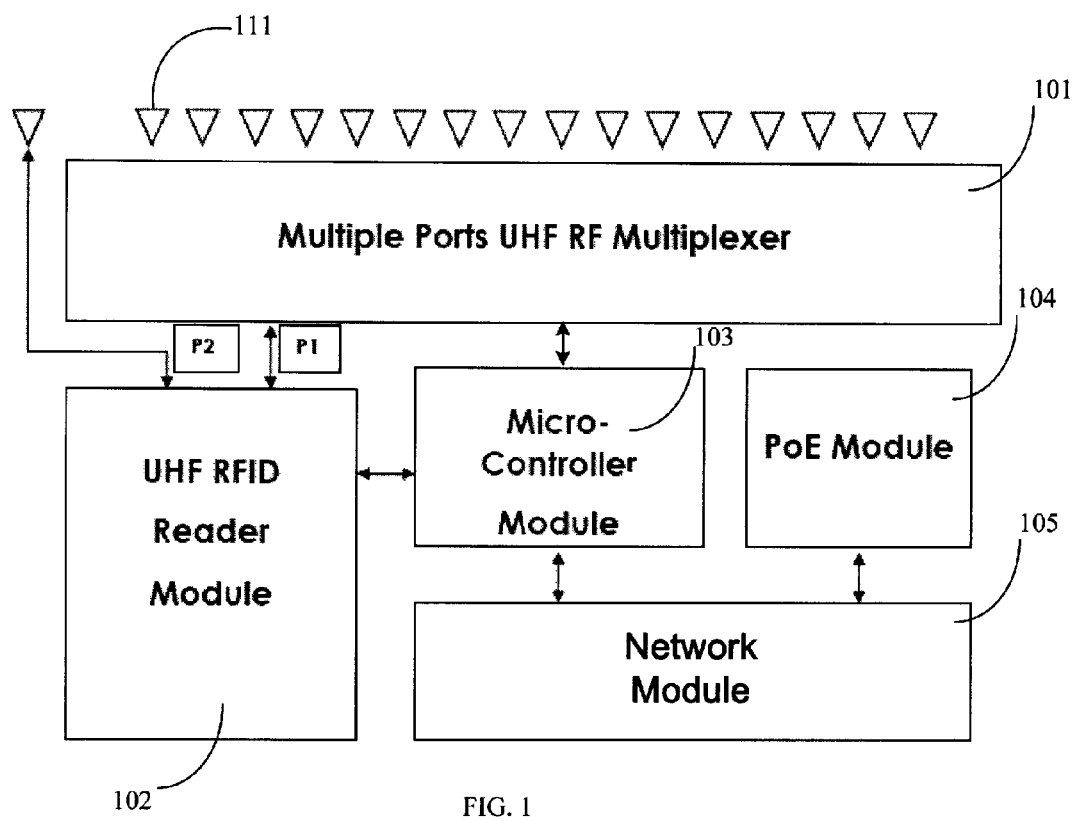
FIG. 1 is a block diagram of an RFID reader according to an embodiment of the present patent application.

FIG. 1 illustrates a block diagram of an RFID reader according to an embodiment of the present patent application. Referring to FIG. 1, the RFID reader includes a UHF (Ultra High Frequency) RF multiplexer 101 with a plurality of antenna ports (there are 16 antenna ports in the illustrated embodiment), a UHF RFID reader module 102, a micro-controller module 103, a PoE (Power over Ethernet) module 104, and a network module 105, which is suitable for LAN (Local Area Network) TCP/IP (Transmission Control Protocol/Internet Protocol) communication in this embodiment. A plurality of UHF RFID antennas 111 can be connected to the antenna ports of the multiplexer 101. The antennas 111 are configured to communicate with RFID tags proximate to the RFID reader in response to an interrogating command of the reader module 102. The programmable micro-controller module 103 controls the UHF RFID reader module 102 during a read cycle to interrogate the tags. In response to the tags' feedback, the UHF RFID reader module 102 is configured to query the tags through the antennas and send the tag information back to the micro-controller module 103. A communication link is established between the RFID reader and the tags based on a compromised data exchange protocol. The RFID reader module can be manufactured with microelectronics technology with compliance to the EPC GEN2 standard, or the ISO18000-6C standard. The data associated with the tags can be sent to a network through the LAN TCP/IP network module 105. To make the installation convenient, the illustrated embodiment may be operated by power delivered by the PoE module 104, which is connected to the network module 105, under power over Ethernet mode (PoE) and complying with the IEEE 802.3af-2003 standard. The RFID reader module 102 has two built-in internal physical ports available, namely port P1 and port P2 as shown in FIG. 1. In this embodiment, the port P1 is connected to the RF multiplexer 101. The remaining internal physical port P2 is configured for connecting to any external UHF RF antenna device, which can be used to dramatically increase the total number of the antenna ports. It is understood that such connection using the port P2 is optional. A processor (not shown in FIG. 1) can be embedded in the micro-controller module 103 and is configured to monitor any changes in the detection of an RFID tag in an area proximate to the RFID reader relative to a prior interrogation so as to determine whether the data associated with the tag has changed. The micro-controller module 103 is configured to selectively enable a port of the multiplexer 101 one at a time so that the reader module 102 can read/write through that port.

Figure 2A:
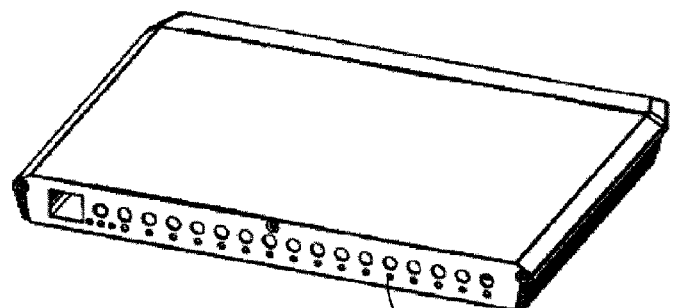
FIG. 2A is a perspective view of the RFID reader illustrated in FIG. 1.
Figure 2B:
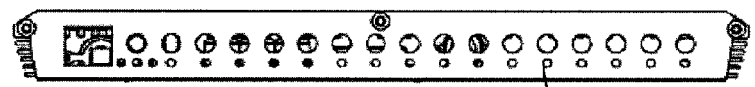
FIG. 2B is a front view of the RFID reader illustrated in FIG. 1.

FIG. 2A is a perspective view of the RFID reader illustrated in FIG. 1. FIG. 2B is a front view of the RFID reader illustrated in FIG. 1. Referring to FIG. 2A and FIG. 2B, the RFID reader is designed as a packed device for connecting to a plurality of UHF RFID antennas under the PoE mode. There are 16 antenna ports in the illustrated embodiment. In this embodiment, a signaling LED (light-emitting diode) 106 is disposed close to each antenna port to indicate if the antenna port is an operable port. The RFID reader can be connected to an Ethernet, which supplies power to the device for its operation. No other power sources are needed.

Figure 3:
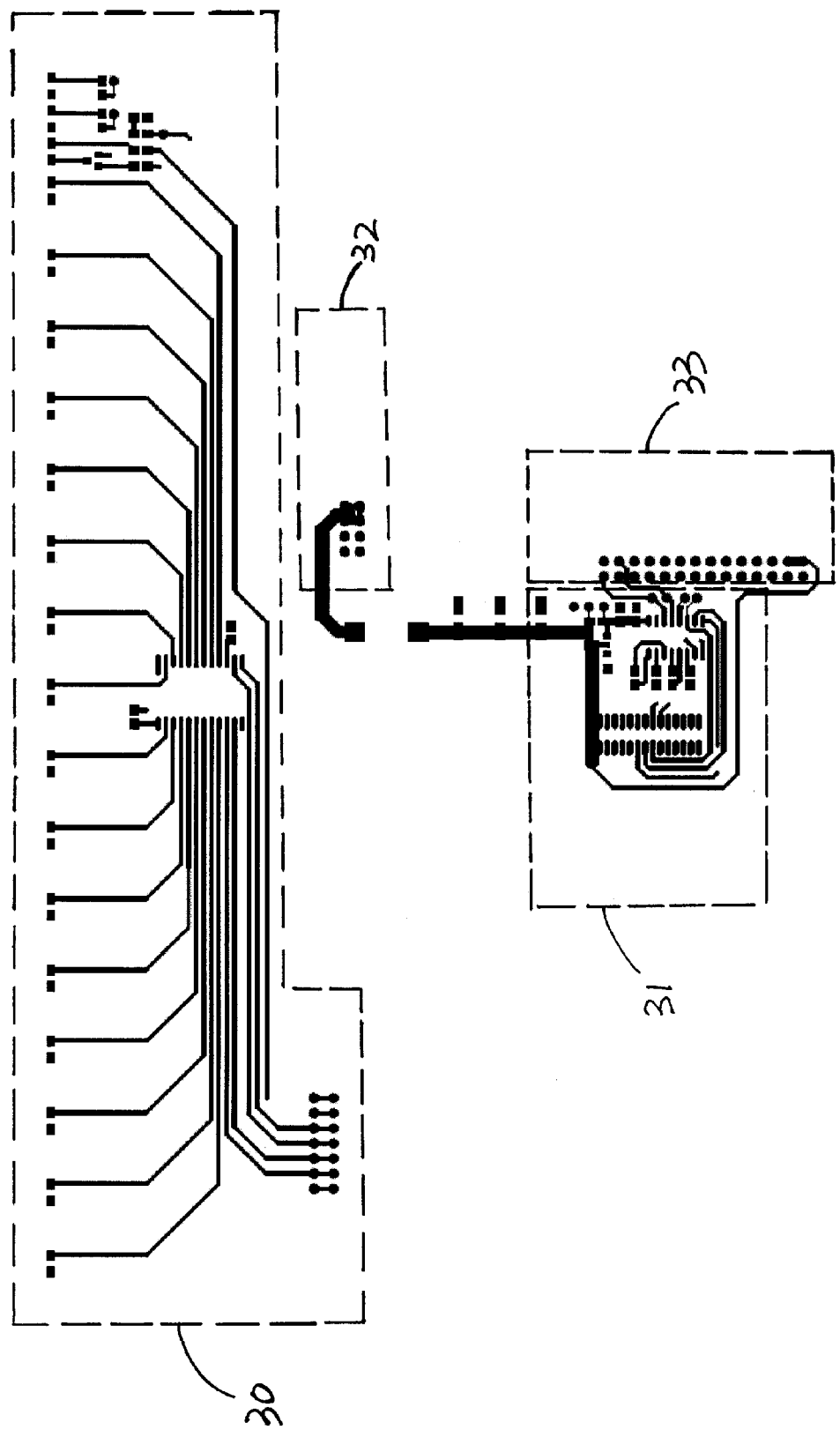
FIG. 3 is a PCB (printed circuit board) layout of the RFID reader illustrated in FIG. 1.

FIG. 3 is a PCB (printed circuit board) layout of the RFID reader illustrated in FIG. 1. Different components, namely the RF multiplexer, the UHF RFID reader module, the micro-controller module, the PoE module and the LAN TCP/IP network module are all configured and integrated on the PCB. In the illustrated embodiment, the dimension of the PCB is 255 mm×132 mm. The PCB layout provides a low cost approach to minimize the component count and reduce the manufacturing cost. In addition, the number of physical devices and power cables for implementation is greatly reduced due to the design that one reader module is configured to be connected to a plurality of UHF RFID antennas and the PoE design featured in the embodiment. Referring to FIG. 3, block 30 shows the PCB layout of a LED controller for controlling the status of the signaling LEDs. Block 31 shows the PCB layout of a connection portion of the UHF RFID reader module. Block 32 shows the PCB layout of a connection portion of the PoE Module connection. Block 33 shows the PCB layout of connection portions of the network module and the micro-controller module.

Figure 4:
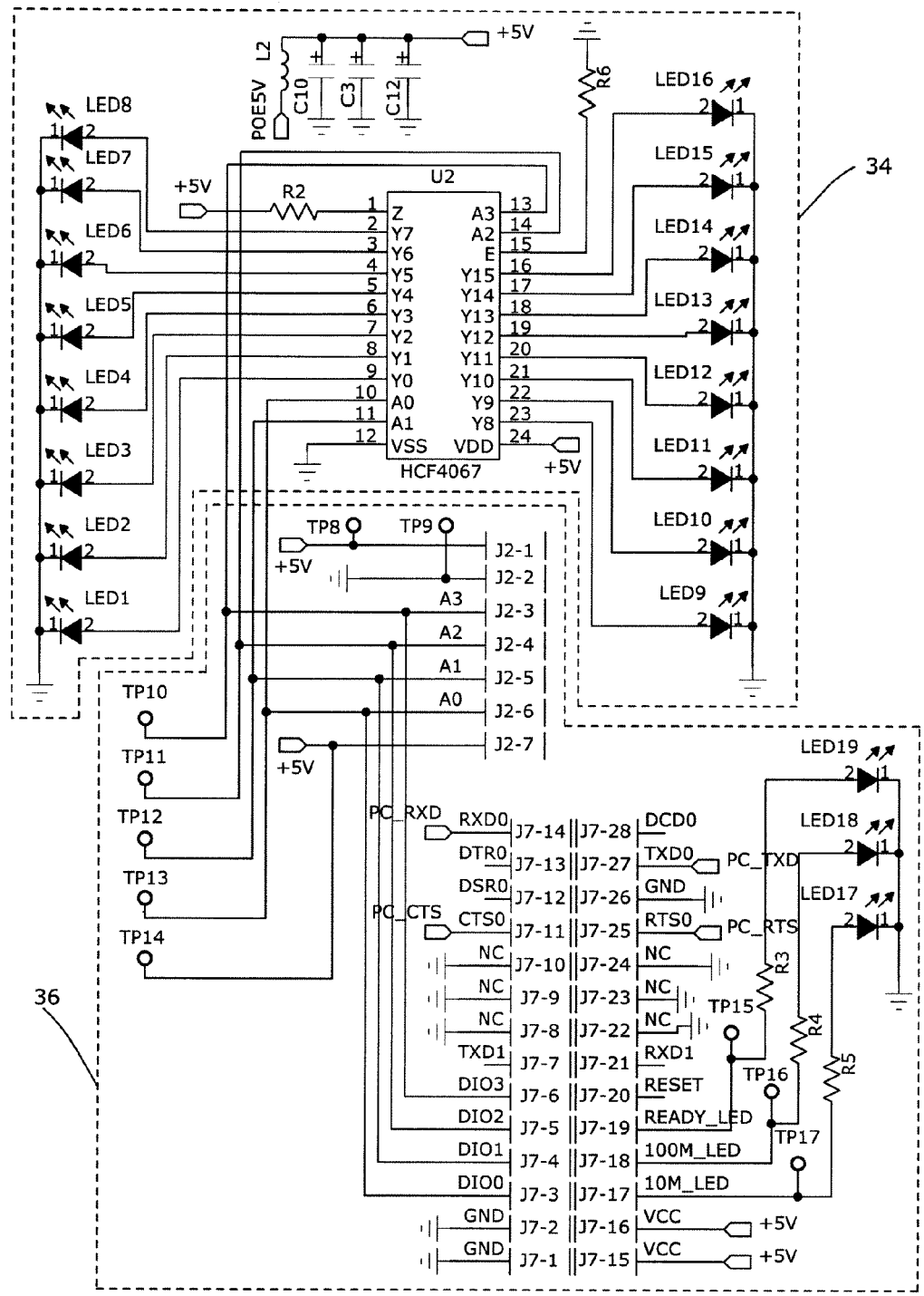
FIGS. 4(a), 4(b) and 4(c) are schematic circuit diagrams of the RFID reader illustrated in FIG. 1.
Figure 4:
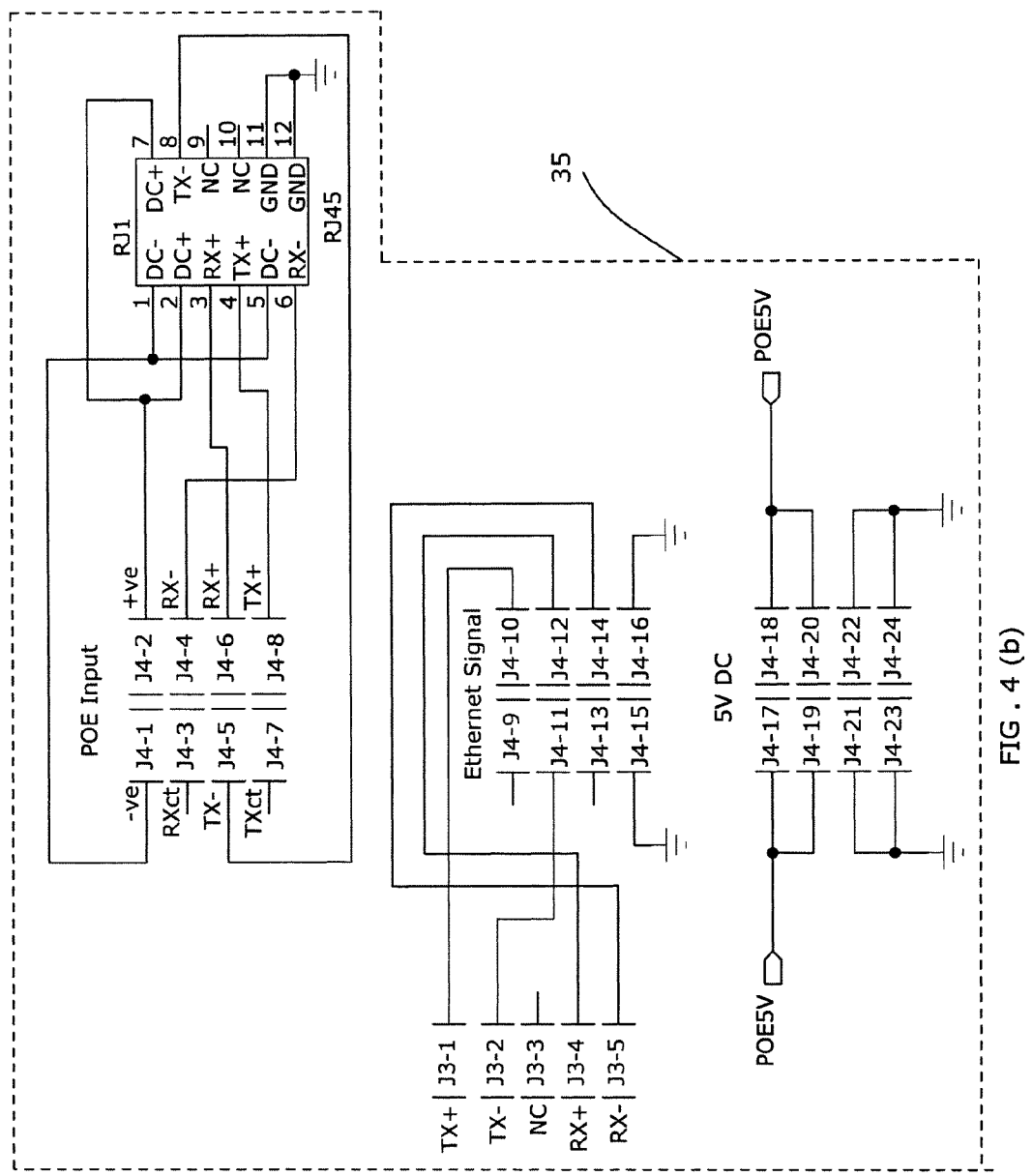
Figure 4:
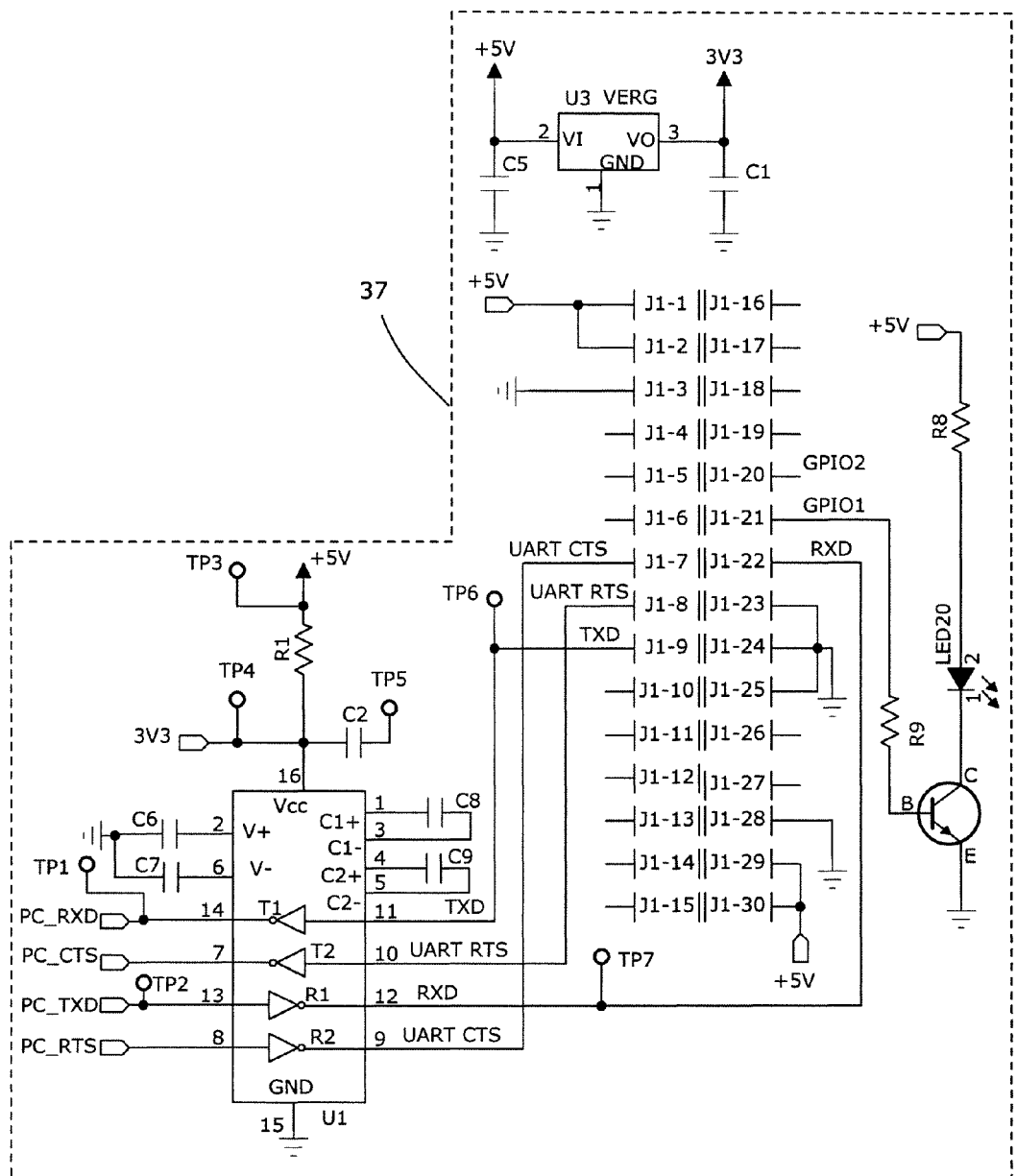

FIGS. 4(a), 4(b) and 4(c) are schematic circuit diagrams of the RFID reader illustrated in FIG. 1. Referring to FIGS. 4(a), 4(b) and 4(c), block 34 shows a schematic circuit diagram for the LED controller. In the illustrated embodiment, there are 16 LEDs for indicating 16 antenna identification signals. The controlling signal is transmitted from the network module and the micro-controller module. Only one LED will be turned on each time. Block 35 shows a schematic circuit diagram for the PoE Module including a connection circuit for the PoE module. The data and electrical supply (in the form electrical current) are transmitted from an Ethernet cable through an RJ-45 connector. The data will be directly transferred to the micro-controller module and the PoE module will make use of the electrical supply delivered through the Ethernet cable and convert the PoE voltage into a 5V system voltage for the whole device to use. Block 36 shows a schematic circuit diagram for the network module and the micro-controller module. The circuit of block 36 handles and regulates the data flow between the reader module, the LEDs and the antenna ports in the multiplexer. Block 37 shows a schematic circuit diagram for the UHF RFID reader module. The power driving this circuit is provided by the PoE Module. The reader module receives commands from the network module and the micro-controller.

Figure 5:
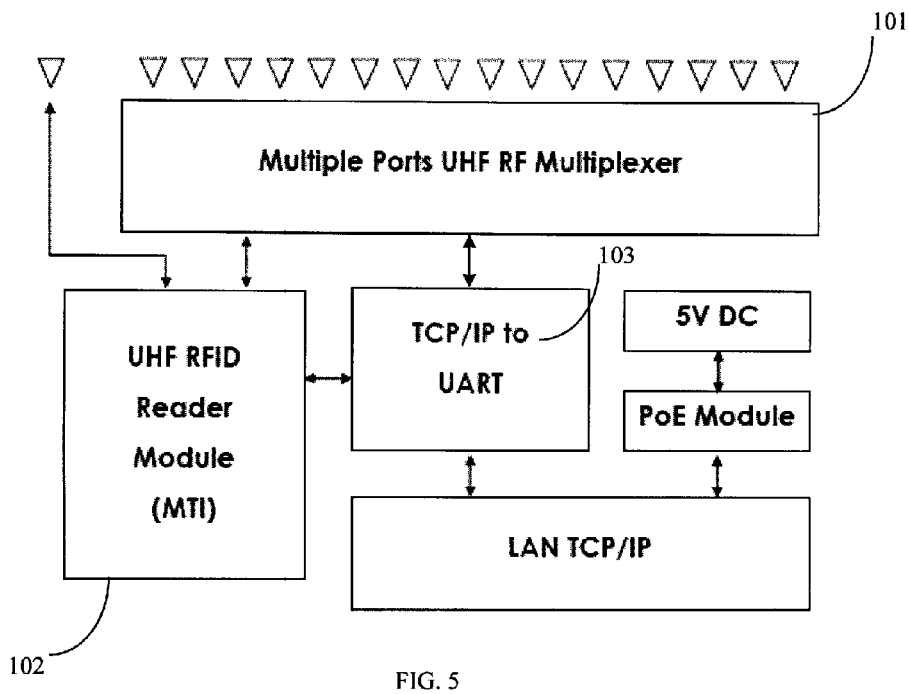
FIG. 5 is a block diagram illustrating the operation of the RFID illustrated in FIG. 1.

FIG. 5 is a block diagram illustrating the operation of the RFID illustrated in FIG. 1. The UHF RFID reader module 102 has two physical ports, one connecting to the multiplexer 101, while the other one being configured to connect to any external antenna device. The UHF RFID reader module 102 requires the micro-controller module 103 to provide UART (universal asynchronous receiver/transmitter) to TCP/IP conversion for data communication and to control the two internal physical ports in feeding data. A DC 5V is generated by the PoE module as a power supply voltage when the device is connected to a LAN.

Figure 6:
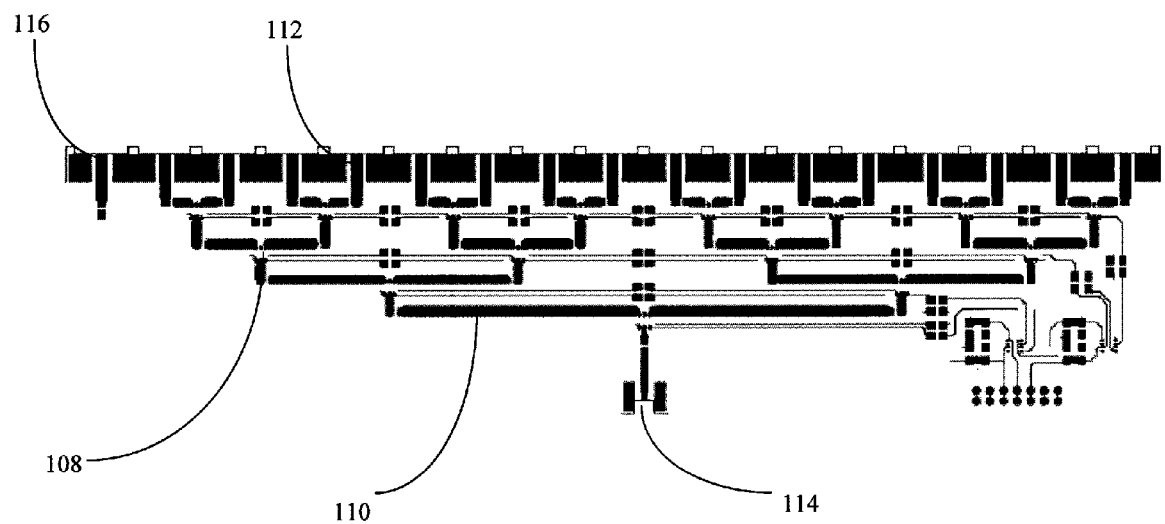
FIG. 6 is a PCB layout of an RF multiplexer of the RFID reader illustrated in FIG. 1.
Figure 7:
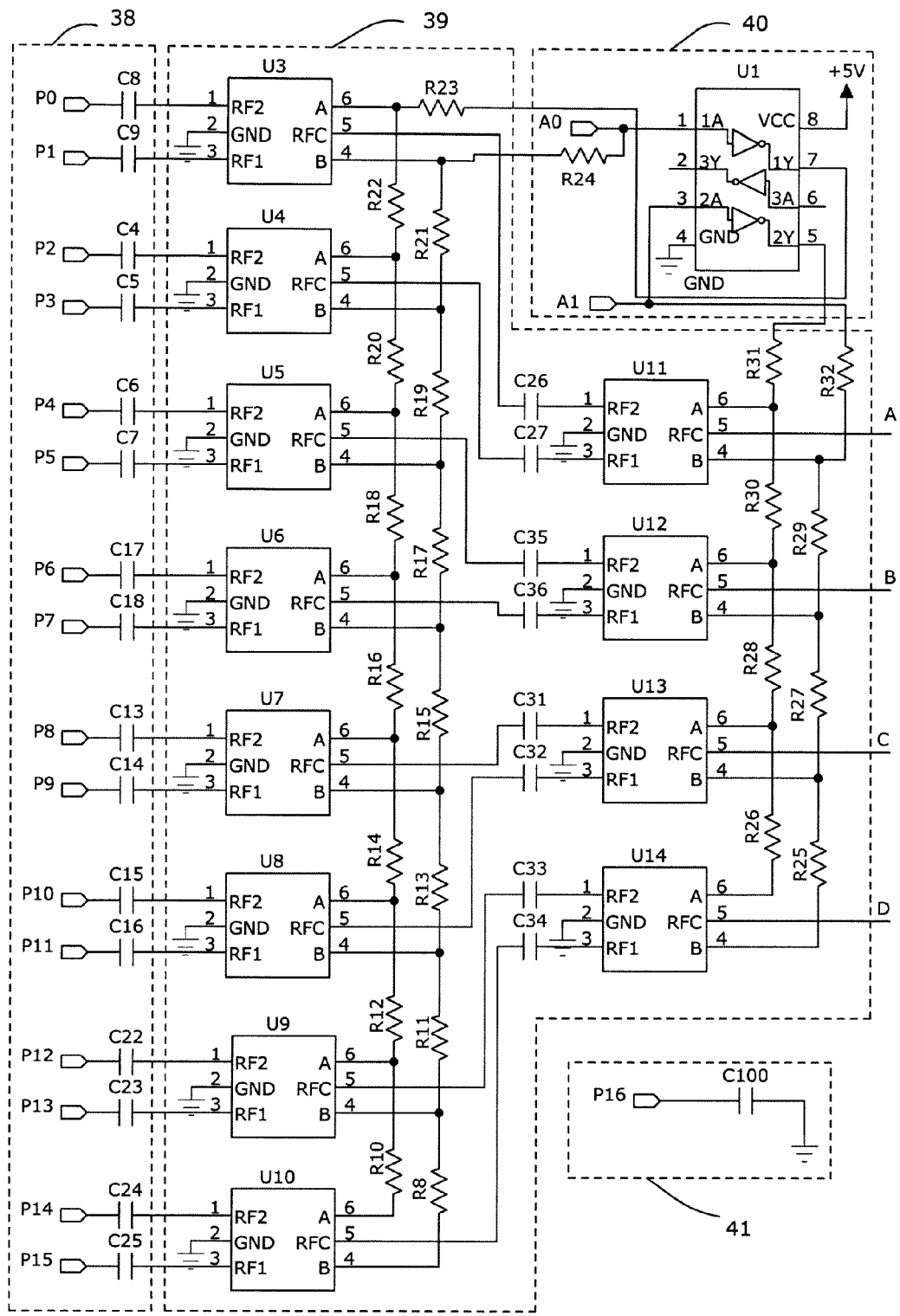
FIGS. 7(a), 7(b) and 7(c) are schematic circuit diagrams of the RF multiplexer illustrated in FIG. 6.
Figure 7:
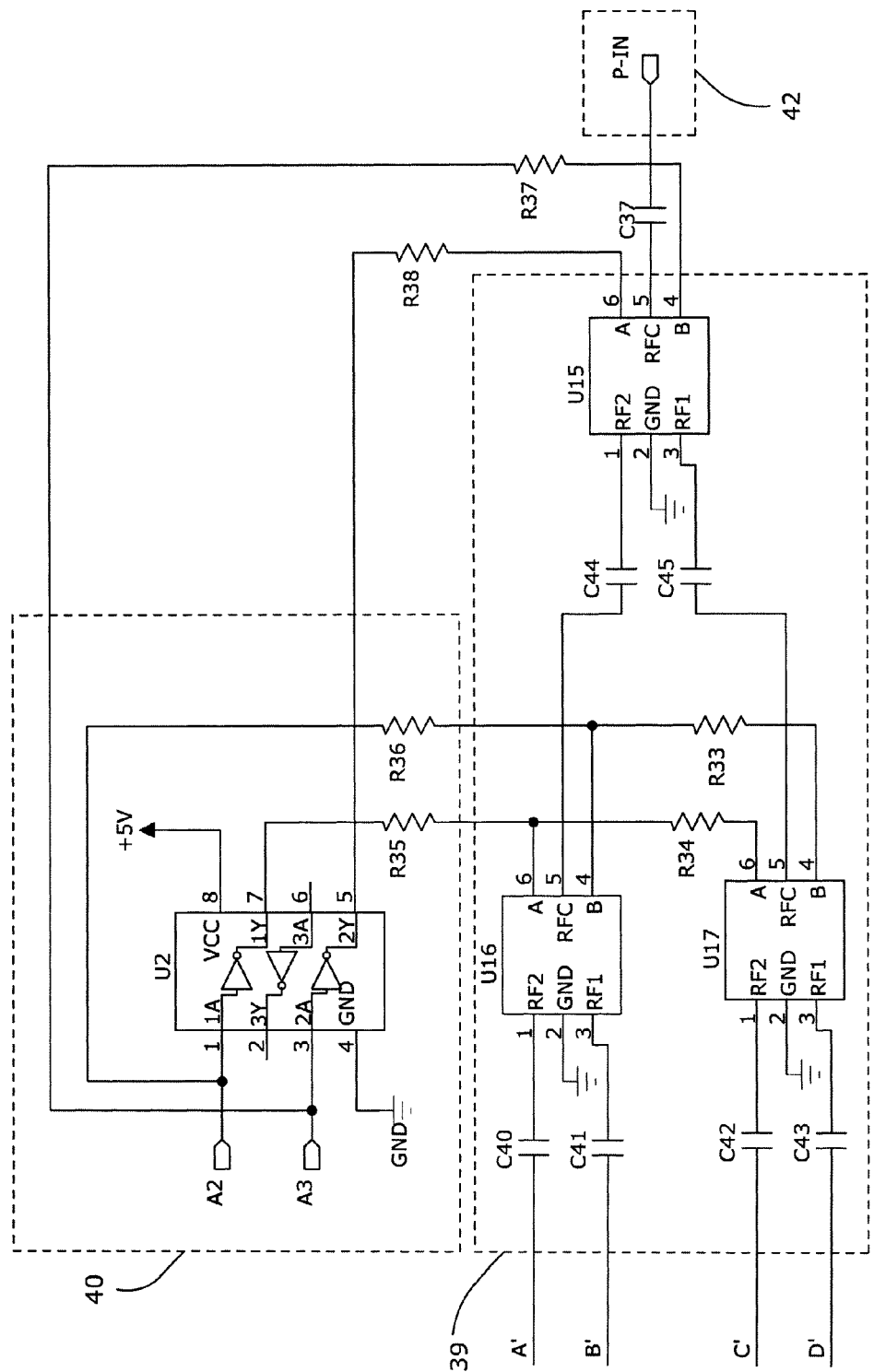
Figure 7:
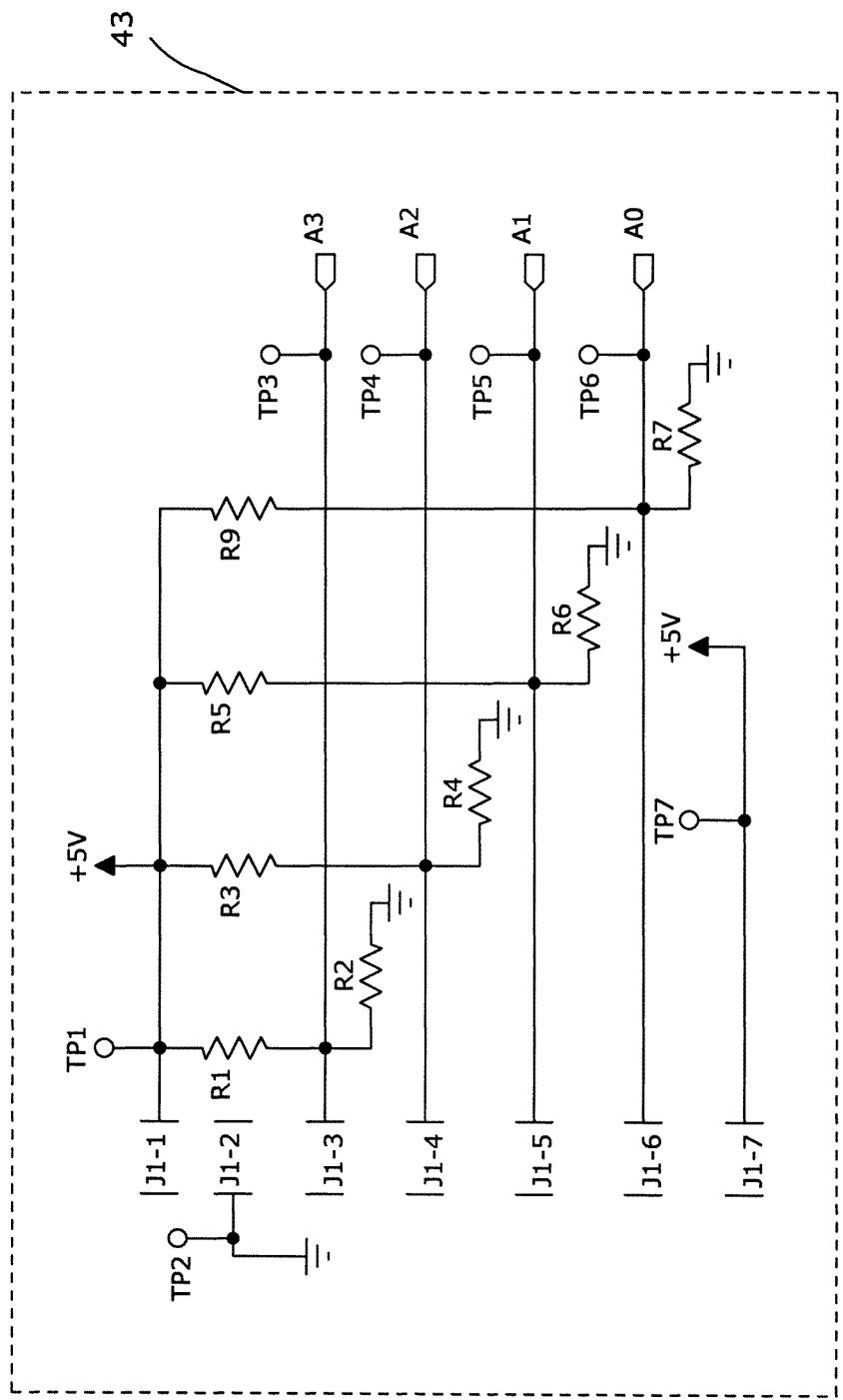
Figure 8:
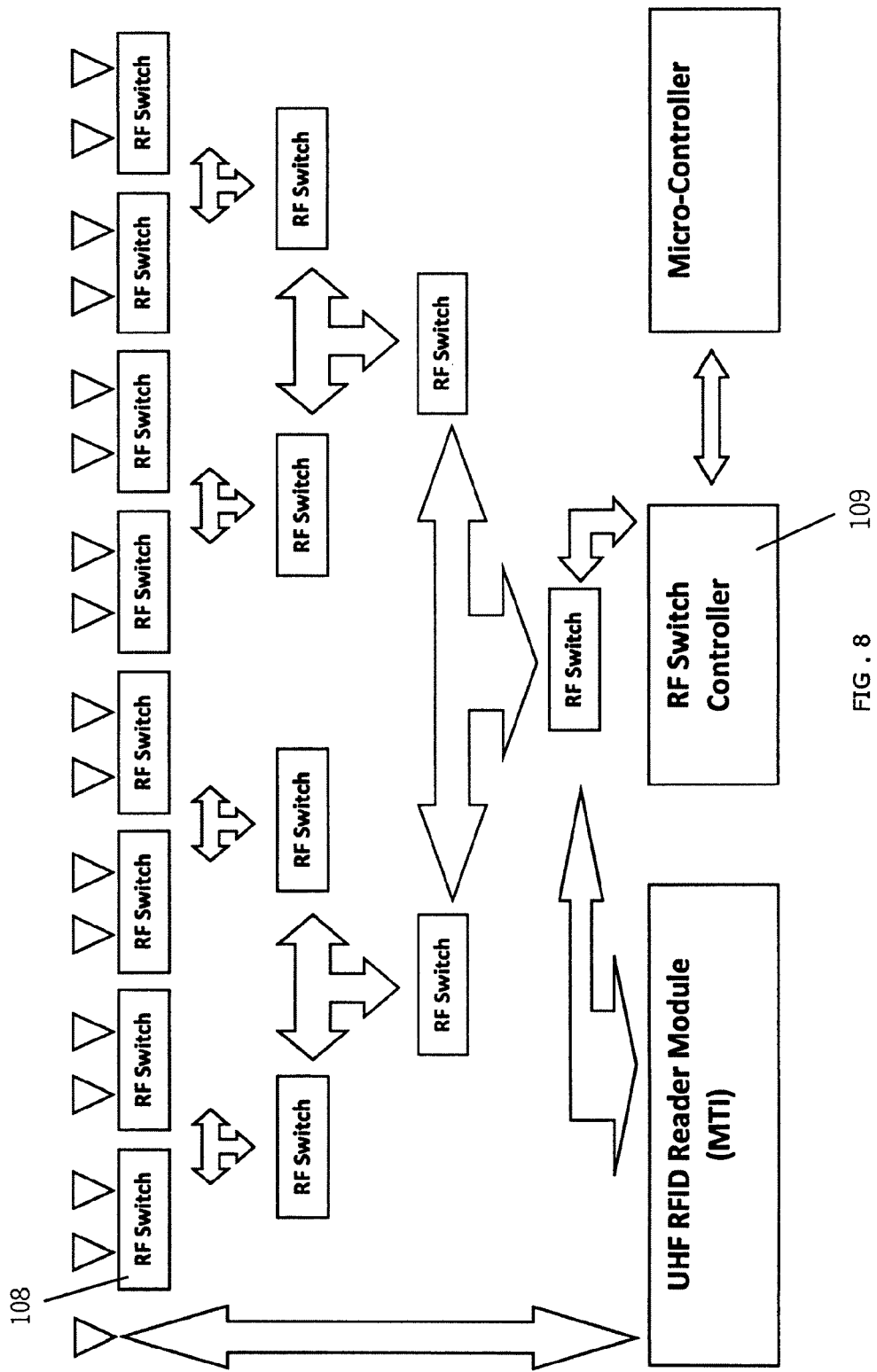
FIG. 8 is a block diagram of the RF multiplexer illustrated in FIG. 6.

FIG. 6 is a PCB layout of the RF multiplexer of the RFID reader illustrated in FIG. 1. FIGS. 7(a), 7(b) and 7(c) are schematic circuit diagrams of the RF multiplexer illustrated in FIG. 6. A, B, C and D in FIG. 7(a) are connected to A', B', C' and D' in FIG. 7(b). FIG. 8 is a block diagram of the RF multiplexer illustrated in FIG. 6. Referring to FIG. 6, FIG. 7(a), FIG. 7(b), FIG. 7(c) and FIG. 8, the RF multiplexer circuit includes a plurality of co-planar waveguides 110 each having an interior cavity, a plurality of RF input (or output) ports 112, an RF output (or input) port 114, and a plurality of RF switches 108. The RF multiplexer in this embodiment has 16 RF input (or output) ports and may only require 15 RF switches 108 as shown in FIG. 6. The RF switches 108 are, for example, TX/RX (transmitting/receiving) RF switches. The RF input (or output) ports 112 are configured to be the antenna ports for connecting to the antennas and the RF output (or input) port 114 is connected to the internal port 1 of the reader module 102 in FIG. 1. The overall design can minimize the insertion/power loss of the RF multiplexer up to −2 dB when the RF multiplexer is operating at UHF (840-954 MHz). Referring to FIG. 6, the RF multiplexer circuit further includes a dedicated RF port 116, which is directly connected with one of the two RFID reader module's internal physical ports, providing a RF port for connecting the RFID reader module to external antenna devices.

Referring to FIGS. 7(a), 7(b) and 7(c), block 38 shows a plurality of external RF Ports for UHF antenna connection corresponding to the RF ports 112 in FIG. 6, which provide a connecting media for UHF antenna connection. Block 39 shows a circuit including the RF switches corresponding to the RF switches 108 in FIG. 6. The circuit is to switch one of the 16 antenna ports to a single RF port, which is connected to block 42. Only one antenna port becomes active in each RF operation. Block 40 shows a circuit of a logic controller for the RF switches, which can also be called an RF switch controller. The logic controller receives control logic signals from the micro-controller for switching the RF switches. Block 41 shows a dedicated RF port P16, which is directly connected with one of the two RFID reader module's internal physical ports, providing a RF port for connecting the RFID reader module to external antenna devices. It is noted that block 41 refers to the port 116 in FIG. 6. Block 42 shows a connection port P_IN for connecting the RF multiplexer to the RFID reader module. P_IN is directly connected with another RFID reader module's internal physical port for switching the port to one of the 16 antenna ports one at a time. Block 43 shows a connection circuit for connecting the RF switch controller to the micro-controller 103 in FIG. 1.

In the illustrated embodiment, the width of the RF (radio frequency) traces forming the waveguides 110 of the UHF multiplexer is 1.778 mm, which is a critical dimension with the PCB thickness being 1.6 mm and the PCB material being FR4 (Flame Retardant 4). This choice of RF trace width is adopted from co-planar waveguide design techniques and result in a minimum RF power loss as low as −2 dB in the circuit.

In the illustrated embodiment, a form factor as small as 192 mm×50 mm is achieved for the RFID reader with the 16-port RF multiplexer including the PCB on which the system is integrated. The key advantages of this design lie in the low cost of the dielectric material and the small size of the co-planar waveguide. FIG. 8 also illustrates the operation principle of the RF multiplexer. Referring to FIG. 8, the RF switch controller 109 corresponds to the block 40 in FIG. 7(a) and enables an antenna port one at a time.

Figure 9:
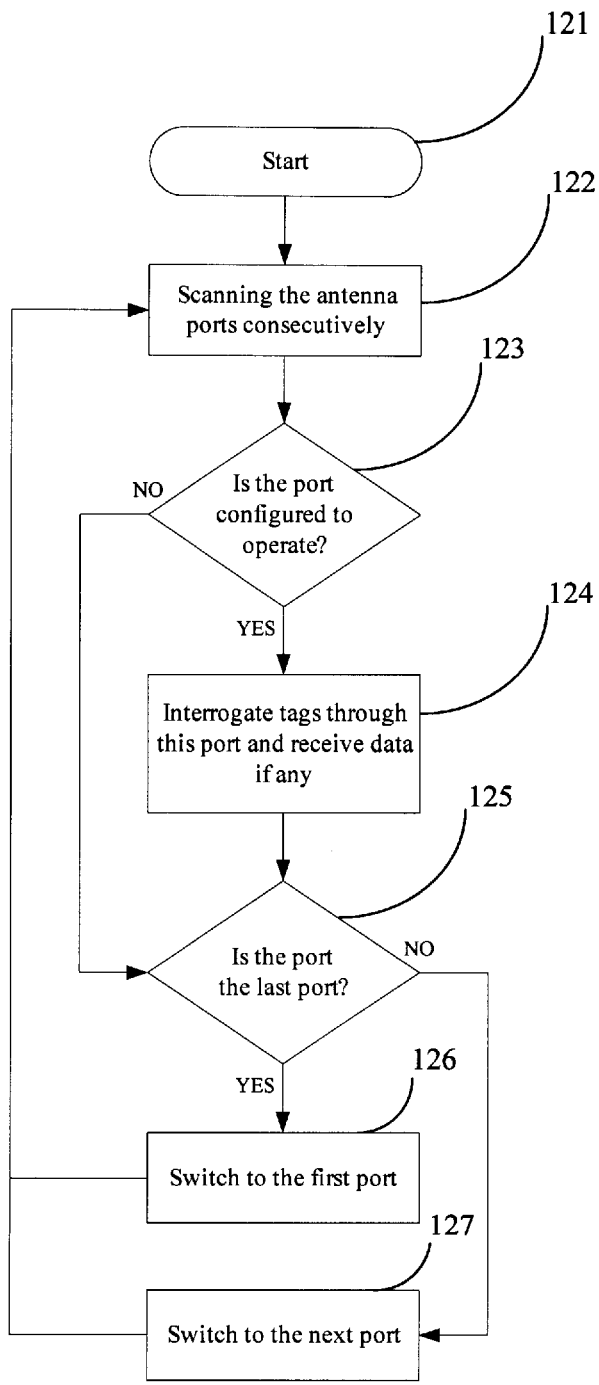
FIG. 9 is a flow chart of the operation mechanism of the RFID reader illustrated in FIG. 1.

FIG. 9 is a flow chart of the operation mechanism of the RFID reader illustrated in FIG. 1. Referring to FIG. 9, when a network cable (from a powered-up device) is connected to the RFID reader, the reader starts its processing as its power supply is made available through PoE (Step 121). The RFID reader will then start scanning and processing signals at each antenna port consecutively (Step 122). The RFID reader will check if the port is configured as an operable port, i.e. whether the port is ready to be used by the RFID reader (Step 123). In this embodiment, as illustrated in FIG. 2A and FIG. 2B, the signaling LEDs 106 are respectively disposed close to each antenna port to indicate if the antenna port is an operable port. If the antenna port is an operable port, the RFID reader will utilize the port by interrogating any tags through an antenna connected to the port, and processing any data received by the antenna through the antenna port (Step 124). Afterwards, the antenna port will be checked if it is the last operable port of the RFID reader in the scanning queue (Step 125). If the port is not an operable one in Step 123, the processing flow goes directly to check if it is the last operable port in the scanning queue (Step 125). If the current port is the last operable port, the processing flow will switch to scanning the first port (Step 126) and loop back to the port scanning of Step 122. If it is not the last configured operable port in Step 125, then the processing flow will switch to scanning the next port of the RFID reader (Step 127). The above-mentioned process is executed by the micro-controller module and goes on until power supplied to the RFID reader is interrupted (for example when the network cable is not connected to the RFID reader or when the network cable is not connected to a powered-up device).

Figure 10:
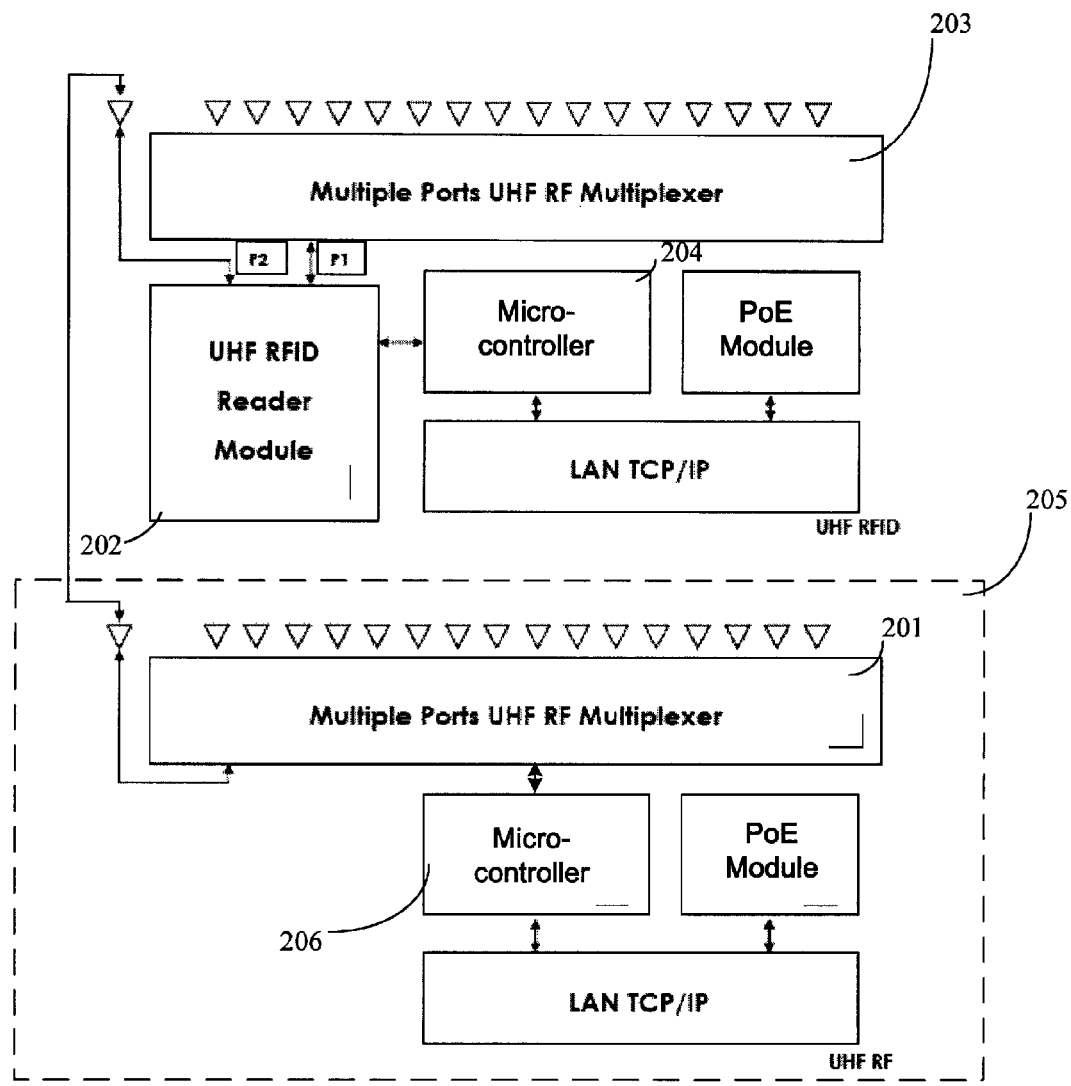
FIG. 10 is a block diagram of an RFID reader according to another embodiment of the present patent application.

FIG. 10 is a block diagram of an RFID reader according to another embodiment of the present patent application. Referring to FIG. 10, in this embodiment, an external antenna device 205 is connected to an RFID reader as illustrated in FIG. 1 through the internal physical port P2 of the reader module 202. The external antenna device 205 includes a UHF RF multiplexer 201 with a plurality of antenna ports (16 ports as in this embodiment). In this embodiment, the external antenna device 205 is an RFID device similar to the RFID reader illustrated in FIG. 1 except that the external antenna device 205 does not have a built-in reader module. By connecting the UHF RF multiplexer 201 of the external antenna device 205 to the internal physical port P2 of the UHF RFID reader module 202 with an RF cable, the number of available antenna ports is increased significantly. The reader module 202 is configured to control the built-in internal physical ports P1 and P2. At one moment when the reader module 202 utilizes the multiplexer 201 of the external antenna device 205 through the internal physical port P2, the reader module 202 is configured to interrogate the tags through the multiplexer 201, and to receive and process data transmitted from the multiplexer 201. The multiplexer 201 is independently controlled by a micro-controller module 206 of the external antenna device 205. At another moment when the reader module 202 utilizes the multiplexer 203 embedded in the RFID reader through the physical internal port P1, the reader module 202 is configured to interrogate the tags through the multiplexer 203, and to receive and process the data transmitted from the multiplexer 203. It is understood that in FIG. 10 the micro-controller module 206 is configured to selectively enable a specific antenna port of the RF multiplexer 201 in a similar way as the micro-controller module 204 is configured to selectively enable a specific antenna port of the RF multiplexer 203. With the expanded number of antenna ports, the RFID reader in this embodiment can perform the process as illustrated in FIG. 9 by taking the antenna ports provided by both the RF multiplexer 203 and the RF multiplexer 201 as operable ports.

Figure 11:
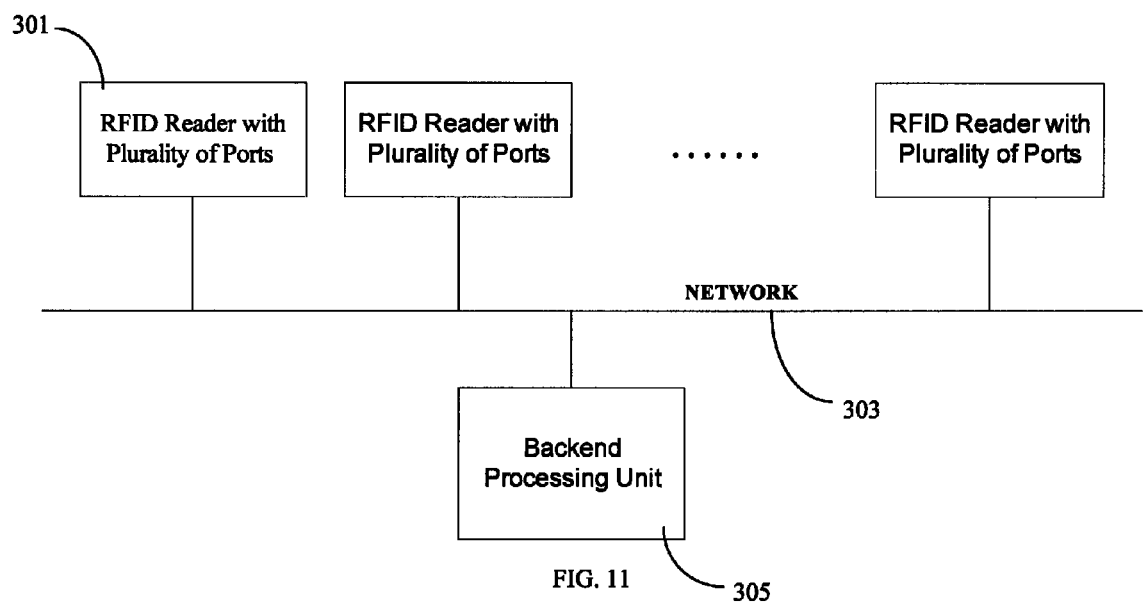
FIG. 11 illustrates how multiple RFID readers are connected over a network to form an RFID reader system according to yet another embodiment of the present application.

FIG. 11 illustrates how multiple RFID readers are connected over a network to form an RFID reader system according to yet another embodiment of the present application. Referring to FIG. 11, multiple RFID readers 301 are connected to a LAN 303 and become multiple network access points on the network 303. Thus, the RFID readers 301 on the same network 303 form a network of access points for UHF RFID tag interrogation. Each RFID reader 301 operates as described above and the received data is sent back to a back-end processing unit 305 for further processing. It is understood that by cascading the RFID readers 301 through a network, the number of antenna ports can be increased dramatically under this architecture.

The above embodiments of the present patent application are suitable to be applied to an environment where a great number of antennas need to be installed. For example, in a smart shelf system, many antennas need to be installed to numerous shelves or racks. The above embodiments provide a single RFID reader having a number of expandable antenna ports. The installation and cabling complexity is reduced. The cost of the overall system is reduced as well because a smaller number of devices are required in the installation.

While the present patent application has been shown and described with particular references to a number of embodiments thereof, it should be noted that various other changes or modifications may be made without departing from the scope of the present invention.

What is claimed is:

1. A radio frequency identification (RFID) reader comprising:
a radio frequency (RF) multiplexer, the RF multiplexer comprising a plurality of antenna ports for connecting with a plurality of antennas respectively;
a reader module, the reader module comprising a first internal port and second internal port and being configured for communicating with a tag proximate to the RFID reader through one of the first and the second internal ports;
a network module for connecting the RFID reader to a network;
a micro-controller module being connected to the RF multiplexer, the reader module and the network module, the micro-controller module being configured for controlling the reader module to communicate with the tag through a selected antenna port of the RF multiplexer or an external antenna device and for controlling the network module to communicate with the network;
a power over Ethernet (PoE) module, the PoE module being integrated with and connected to the network module and configured for supplying power transferred from the network to the RFID reader; and the PoE module is also configured and integrated on a PCB; and
a processor, the processor being embedded in the micro-controller module and configured to monitor any changes in the detection of the RFID tag so as to determine whether the data associated with the tag has changed since a previous detection; wherein
the first internal port of the reader module is connected to the RF multiplexer for the reader module to utilize the antennas connected to the antenna ports of the RF multiplexer;
the second internal port of the reader module is configured for connecting to the external antenna device so that the reader module can utilize an external antenna connected to a selected antenna port of the external antenna device;
the RF multiplexer, the reader module, the micro-controller module and the network module are all configured and integrated on the PCB;
the RF multiplexer comprises a plurality of RF switches, a plurality of co-planar waveguides for connecting the RF switches and each having an interior cavity, a first set of RF ports being configured to be the antenna ports, a second RF port, and an RF switch controller for selectively enabling a communication path between one of the first set of RF ports and the second RF port, the waveguides respectively comprising an RF trace having a width of 1.778 mm; and
the PoE module converts the electrical voltage of PoE into a 5V system voltage for supplying to the whole RFID reader.

2. The RFID reader of claim 1, wherein the RF traces form the waveguides so as to have widths 1.778 mm, the PCB has a thickness of 1.6 mm, and material of the PCB is Flame retardant 4.

3. The RFID reader of claim 1, wherein the micro-controller module is configured to provide a UART (universal asynchronous receiver/transmitter) to TCP/IP (Transmission Control Protocol/Internet Protocol) for data communication and to control the first and the second internal ports in feeding data.

4. The RFID reader of claim 1, wherein the first set of RF ports are configured to be the antenna ports for connecting to the antennas, and the second RF port is connected to the first internal port of the reader module.

5. The RFID reader of claim 1, wherein the RF switches are TX/RX (transmitting/receiving) RF switches.

6. The RFID reader of claim 1, wherein the RF multiplexer further comprises a dedicated RF port and the second internal port of the reader module is configured for connecting to the external antenna device through the dedicated RF port.

7. The RFID reader of claim 1, wherein the second internal port of the reader module is connected to an external antenna device, the external antenna device comprising:
a radio frequency (RF) multiplexer, the RF multiplexer comprising a plurality of antenna ports for connecting with a plurality of antennas respectively;
a network module for connecting the external antenna device to a network; and
a micro-controller module being connected to the RF multiplexer and the network module of the external antenna device, and being configured for enabling the reader module to communicate with the tag through a selected antenna port of the RF multiplexer of the external antenna device and for controlling the network module to communicate with the network.

8. The RFID reader of claim 1, wherein the second internal port of the reader module is connected to the RF multiplexer of the external antenna device through an RF cable.

9. The RFID reader of claim 7, wherein the second internal port of the reader module is connected to the RF multiplexer of the external antenna device through an RF cable.

* * * * *